UNITED STATES PATENT OFFICE.

ALBERT DE BARY, JR., OF NEW YORK, N. Y.

POLISH.

1,301,823. Specification of Letters Patent. Patented Apr. 29, 1919.

No Drawing. Application filed August 1, 1918. Serial No. 247,799.

*To all whom it may concern:*

Be it known that I, ALBERT DE BARY, Jr., a subject of the King of Belgium, resident at the borough of Manhattan, in the city, county, and State of New York, have invented a certain new and useful Polish, of which the following is the specification.

This invention may be used as a polish for motor cars, furniture, wood-work, linoleum, any painted surface whatsoever and on any objects composed of material which will take or acquire a polish through the application of a polishing liquid on the surface thereof.

The object of my invention and its particular advantages are that it cleans the surface to which it is applied and removes grease and dirt therefrom and dries immediately after application and forms a hard, non-cracking, highly polished surface free from dust to which neither dirt nor dust will adhere. The polished surface so resulting is durable and requires to produce the same no other labor than is required in applying the liquid to the object it is desired to polish.

My composition consists of a mixture of lime water, oils of paraffin, turpentine and linseed, powdered gum arabic, ammonia water with a quantity of pure water added thereto for dilution to the proper strength for use.

In preparing the composition I prefer to use the ingredients in about the following proportions on the basis of percentage:

Paraffin oil _____ 30%
Turpentine oil _____ 10%
Linseed oil _____ 12%
Powdered gum arabic (by weight) __ 7%
Lime water _____ 8%
Ammonia water _____ 5%
Pure water _____ 28%

The manner of mixing the ingredients is as follows: The powdered gum arabic is dissolved in linseed oil and lime water, thereafter paraffin oil and turpentine oil and the ammonia water are added and to the mixture thus formed is added water sufficient to make the solution in the quantity desired.

It may be applied in one or more coats or layers by brush, felt or woolen or cotton cloths in the ordinary manner according to the nature of the article and the amount of polish required.

My composition is effective in the removal of dirt and grease from the surface to be polished and dries immediately after application, forming a hard, highly polished surface without crack, to which neither dust nor dirt adheres.

I claim:

1. A liquid composition adapted to the removal of grease and dirt from polished surfaces of motor cars, furniture, wood-work, linoleum and any painted surface whatsoever which will take or acquire a polish through the application of a polishing liquid on the surface thereof and a quick drying, hard, non-cracking polish to which neither dust nor dirt adheres, comprising 30 c. c. paraffin oil, 10 c. c. turpentine oil, 12 c. c. linseed oil, 7 grams powdered gum arabic, 8 c. c. lime water, 5 c. c. ammonia water containing 10% ammonia and pure water to make 100 c. c.

2. A quick drying liquid polish, forming a highly polished surface without cracking, consisting of powdered gum arabic dissolved in paraffin oil, turpentine and linseed oils in a diluted alkali substantially as described.

ALBERT DE BARY, JR.